Patented Dec. 2, 1947

2,431,788

UNITED STATES PATENT OFFICE 2,431,788

METHOD OF PRODUCING NONSICCATIVE ROSIN OILS

Roger Septime Auguste Collonges, Lyon, and Jean Philippe Simon Vallée, Alfort, France, assignors to "Chimiotechnic" Union Chimique du Nord et du Rhône, Société Anonyme, Venissieux, France No Drawing. Application January 31, 1945, Serial No. 575,581. In France August 31, 1943

3 Claims. (Cl. 260—106)

It is known that the dry distillation of rosin has been commonly carried out for many years for the purpose of deriving therefrom oils which, depending upon the resultant fractions or upon the process of production employed, have different color, viscosity and acid index but which possess this feature in common that when they are heated to 100° C. for 12 hours in a drying oven they become desiccated and oxidized, thereby leaving residual tacky and sticky or sometimes dry substances which can be used as coatings or varnishes.

In order to generalize the use of such oils for industrial purposes, it is necessary to do away with their highly objectionable siccativity. The principal processes which have been employed to that effect all consist in hydrogenizing under pressure and in the presence of catalysts the resultant oils in order to convert all the fractions into non-oxidizable saturated hydrocarbons. Satisfactory attempts were also made for dehydrogenating the two cyclanic nuclei and the cyclenic nucleus so as to obtain three cyclic nuclei as in hydrocarbons of the retene type when distilling rosin or rosin oils prepared by any suitable process in the presence of a large excess of sulphur. The reaction involving the elimination of hydrogen sulfide leads to solid cyclic hydrocarbons whose melting point is of the order of 100° C. These fully cyclic hydrocarbons have a very low iodine value but are practically useless owing to their high melting point.

It is an object of the present invention to provide a new method of producing non-siccative rosin oils by such improved means as to yield liquid hydrocarbons of the octohydroretene and retene types containing in their molecule two saturated cyclanic nuclei and a true cyclic nucleus.

Another object of the invention is to provide a method as aforesaid for producing such liquid hydrocarbons which when heated to 100° C. for twelve hours in a drying oven and thereafter exposed to the air do not lose their lubricating properties and do not yield tacky residues but are liquid at usual temperatures, have a very low acid index and are almost colorless.

A further object of the invention is to provide a method as aforesaid which only requires about one per cent of sulphur with respect to the weight of rosin or rosin oil, the great saving in sulphur thus achieved being accompanied by the additional advantage of almost entirely doing away with any evolution of sulphuretted hydrogen and of giving rise to products which no longer require to be deodorized, such products being utilisable for miscellaneous uses such as machine lubrication, textile fibre oiling, leather oiling, etc., as substitutes for common oils obtained by distilling natural or synthetic petroleums.

A still further object of the invention is to provide, as a result of the carrying of the aforesaid method into industrial practice, an oily composition of matter of colorless and non-siccative character comprising hydrocarbons of the octohydroretene and retene types having a very low acid index, said oily composition being utilisable for general purposes of lubrication and oiling in several industries.

With these and such other objects in view as will incidentally appear hereafter, the invention comprises the novel steps and sequence of steps that will come out of the continuation of this specification and that will be more particularly pointed out in the following claims.

According to the invention, natural resins or rosin oils are so partly dehydrogenized as to give rise to liquid hydrocarbons of the octohydroretene and retene types comprising in their molecule two saturated cyclanic nuclei or rings and a true cyclic nucleus or ring. The reaction is advantageously conducted by means of sulphur which is regenerated or reclaimed during the process by a simultaneous action of oxygen and ferric oxide, thereby lessening the quantity of sulphur to about one per cent, while almost entirely preventing any evolution of hydrogen sulfide. The volume of air should be strictly adjusted to suit the reaction which it is desired to perform. The reaction may be more or less thoroughly conducted by keeping the mass under reaction for a proper duration at a temperature substantially equal to or higher than 250°.

Hydrocarbons obtainable by the present method have a very low iodine value. When heated to 100° C. for twelve hours in a drying oven and then exposed to the air, they keep their lubricating qualities and do not yield tacky residues. Moreover, they are liquid at ordinary temperatures, have a very low acid index and are almost colorless.

The following diagram recalls a few main formulae of hydrocarbons of this category, the arrows $a$, $b$ and $c$ respectively indicating the effect on rosin I of hydrogenation, usual dehydrogenation and special dehydrogenation as will be described hereafter.

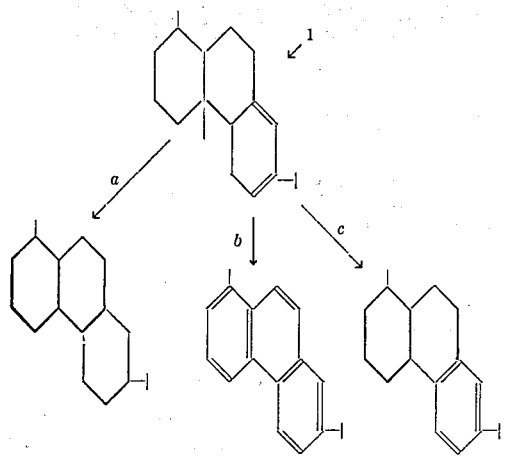

Products resulting from said special dehydrogenization are utilisable instead of mineral oils for all uses. It is even possible by a fractionation under vacuum to obtain hydrocarbons of widely different viscosities down to fractions comparable to vaselines which can be derived from natural petroleums. Higher fractions possess melting points of the order of 35 to 40° C.

In view of the full range of products which can be obtained, uses may be contemplated for all purposes of lubrication including the oiling of textile fibres and leathers, said products serving as substitutes for known oils obtained by distilling natural or synthetic petroleums.

The dehydrogenization process only uses about one per cent of sulphur with respect to the weight of resin or previously prepared ordinary resin oil owing to a regenerating reaction using iron oxide. Apparently the dehydrogenization reaction starts from the cyclenic nucleus or ring of the abietic structure before reaching the two cyclanic nuclei or rings which possess greater resistance.

It will be seen that the method provides the following advantageous results, namely an important saving in the consumption of sulphur, the almost complete elimination of disturbing evolutions of sulphuretted hydrogen and a better conditioning of resultant products which it is no longer necessary to deodorize.

The reaction first involves the cyclenic ring or abietic hydrocarbons. It therefore becomes an easier matter not to miss the sought aim and to keep the dehydrogenization process within the required boundaries, i. e. to restrict said process to the sole cyclanic ring without altering the two cyclanic nuclei or rings.

The general dehydrogenization reaction can be written in the following way:

$$CH_2—CH_2 \ldots +S=$$
$$\ldots CH=CH \ldots +H_2S \quad (1)$$

Sulphuretted hydrogen is evolved, as can be seen, but in the presence of iron oxide, such gas regenerates sulphur:

$$3H_2S+Fe_2O_3=2FeS+S+3H_2O \quad (2)$$

so that about one third of the liberated sulphur returns into the reaction.

In order to bring the whole sulphur back into activity, the following reaction is brought about:

$$4FeS+2O_2=4FeO+4S \quad (3)$$

and $$4FeO+O_2=2Fe_2O_3 \quad (4)$$

The ferric oxide ($Fe_2O_3$) being thus rebuilt in turn provides Reaction 2 and so forth by a chemical action which may be regarded as truly catalytic.

The oxygen which is necessary for the reaction is introduced in the form of an air stream so as to bubble through the mass under treatment. In the medium having highly reducing power such as is available, there occurs no direct oxidization of the abietic hydrocarbons whose affinity is smaller than that of ferrous oxide (FeO) for diluted gaseous oxygen.

It is necessary that into the mass under reaction in view of its regeneration a strictly controlled air volume should be sent to match the reaction which must be produced and that said reaction should be more or less thoroughly conducted while keeping said mass for the required time at a temperature approximating or higher than 250° C.

The reaction which effectively starts from 200° C. makes it possible to obtain in approximately six hours and at a temperature of 250° C. non-siccative oils capable of withstanding a 15 hour treatment in a drying oven at 100° C. without becoming dry.

Likewise at 300° C. and within 6 to 7 hours solid hydrocarbons can be secured which crystallize at normal temperature. It is an easy matter to check up by re-crystallization in alcohol that such hydrocarbons are retene whose melting point is +98° C. These hydrocarbons can be obtained with an excellent output while only using 1% of sulphur, whereas their manufacture in the past always demanded about 50% of sulphur.

A few practical examples will now be given of the way in which the improved method can be carried out:

*Example 1.*—100 kilograms of rosin are introduced into a mixing and heating apparatus of suitable known construction with 1 kilogram of sulphur and 3 to 5 kilograms of ferric oxide, whereupon the temperature is raised to 250° C. and 8 cubic meters of air per hour are injected in stream form into the mass subjected to the reaction. The temperature is maintained while agitating the mass for 6 hours. The resultant oil is distilled and is then found to possess all characteristics of resistance to treatment in a drying oven at 100° C. for 15 hours.

*Example 2.*—100 kilograms of rosin oil are treated under similar conditions in the same apparatus together with 1 kilogram of sulphur and 3 to 5 kilograms of ferric oxide. The temperature is then raised to 300° C. for 6 to 7 hours while the mass is being agitated and while a current of air is injected thereinto at the rate of 8 cubic meters per hour. After distillation, it is found that the resultant substance is a mass which is crystallized at normal temperature and contains high proportions of retenes whose melting point is +98° C.

Oils obtained as in Example 1 and subjected to distillation do show that the resultant hydrocarbons are different from complete cyclic hydrocarbons. The separated lower and liquid fractions have a very low iodine value as semi-liquid heavier fractions.

The distillation takes place as shown by the following chart:

| Fraction No. | Temperature in C. degrees | Weight of collected substance | Acid index | Iodine value |
|---|---|---|---|---|
| 1 | 60 to 235 | 20 | 12 | 41.2 |
| 2 | 235 to 270 | 8 | 12 | 58.7 |
| 3 | 270 to 300 | 12 | 7.2 | 32.7 |
| 4 | 300 to 320 | 7.5 | 9 | 40.9 |
| 5 | 320 to 340 | 54 | 7 | 38 |
| 6 | 340 to 350 | 78 | 6 | 34.6 |
| 7 | 350 to 360 | 97 | 3.6 | 30.2 |
| 8 | 365 to 370 | 26 | 6 | 39 |

The resultant oils, as yielded by the method carried out as set forth in Example 1, are utilisable for the same purposes as oils of mineral origin of equal viscosity, particularly for industrial lubrication and for uses in the leather goods, textile and metallurgical industries. These examples of uses are not limitative.

Solid hydrocarbons of the retene or methylisopropylphenanthrene type obtained as set forth in Example 2 lend themselves to all uses, wherefor hydrocarbons are utilisable, particularly in the dyestuff, pharmaceutical, perfume, photography and like industries.

As will be seen, it becomes possible by properly selecting the temperature and the duration of the reaction to improve the former reaction which usually requires 50% of sulphur and thereby to achieve a considerable saving in the consumption of sulphur. Such reaction is applicable to natural resins and also to oils previously derived from a dry distillation of such resins.

Minor details of carrying the method into industrial practice may vary without departing from the scope of the subjoined claims.

What is claimed is:

1. A method for producing from rosin a non-siccative oily composition of matter, consisting of decarboxylating and partly dehydrogenating the resin at a temperature from about 200° to 300° C. with 1% of sulphur, and ferric oxide in presence of air and purifying the product by distilling the same.

2. A method for producing from rosin a non-siccative oily composition of matter consisting in mixing about 100 parts by weight of said rosin with about one part by weight of sulphur and from three to five parts by weight of ferric oxide, raising the temperature of the mixture to a temperature ranging from about 250° and 300° C., stirring the mix for about 6 hours under the same temperature conditions, injecting air at the approximate rate of 8 cubic meters per hour of said mix for said air to bubble through the mix, and distilling the resultant oily mass.

3. A method for producing from rosin a non-siccative oily composition of matter consisting in treating the rosin with about 1% of sulphur, and an addition of ferric oxide for reclaiming the sulphur and producing ferrous oxide, and injecting a measured amount of air into the mix to regenerate the ferric oxide by reacting upon said ferrous oxide, the process being conducted while maintaining the mix at a temperature from 250° and 300° C.

COLLONGES, ROGER
   SEPTIME AUGUSTE.
VALLÉE, JEAN
   PHILIPPE SIMON.

REFERENCES CITED

The following references are of record in the file of this patent:

UNITED STATES PATENTS

| Number | Name | Date |
|---|---|---|
| 386,830 | Kelbe | July 31, 1888 |
| 1,881,565 | Henke et al. | Oct. 11, 1932 |